(12) United States Patent
Dietz et al.

(10) Patent No.: US 7,970,936 B2
(45) Date of Patent: Jun. 28, 2011

(54) IN A WORLD WIDE WEB COMMUNICATIONS NETWORK SIMPLIFYING THE UNIFORM RESOURCE LOCATORS (URLS) DISPLAYED IN ASSOCIATION WITH RECEIVED WEB DOCUMENTS

(75) Inventors: Timothy Alan Dietz, Austin, TX (US); Walid M. Kobrosly, Round Rock, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2781 days.

(21) Appl. No.: 10/607,585

(22) Filed: Jun. 26, 2003

(65) Prior Publication Data
US 2004/0267961 A1 Dec. 30, 2004

(51) Int. Cl.
*G06F 15/16* (2006.01)
(52) U.S. Cl. ............................. 709/245; 726/6; 713/162
(58) Field of Classification Search .................. 709/203, 709/217, 218, 223, 245, 200; 707/6, 10; 713/153, 162
See application file for complete search history.

(56) References Cited

U.S. PATENT DOCUMENTS

| | | | | |
|---|---|---|---|---|
| 5,751,961 A | * | 5/1998 | Smyk ............................. | 709/217 |
| 5,835,718 A | * | 11/1998 | Blewett ........................ | 709/218 |
| 6,297,819 B1 | * | 10/2001 | Furst .............................. | 715/733 |
| 6,654,741 B1 | * | 11/2003 | Cohen et al. ...................... | 707/6 |
| 7,010,567 B1 | * | 3/2006 | Mori .............................. | 709/203 |
| 7,010,568 B1 | * | 3/2006 | Schneider et al. ............. | 709/203 |
| 7,058,633 B1 | * | 6/2006 | Gnagy et al. ..................... | 707/10 |
| 7,127,608 B2 | * | 10/2006 | Royer et al. ................... | 713/162 |
| 7,149,797 B1 | * | 12/2006 | Weller et al. .................. | 709/223 |
| 7,171,439 B2 | * | 1/2007 | Honig ............................ | 709/200 |
| 7,333,801 B2 | * | 2/2008 | Chandhok .................. | 455/412.1 |
| 7,673,329 B2 | * | 3/2010 | Hui Hsu et al. .................... | 726/6 |
| 2001/0044825 A1 | * | 11/2001 | Barritz .......................... | 709/203 |
| 2003/0037232 A1 | * | 2/2003 | Bailiff .......................... | 713/153 |
| 2003/0182449 A1 | * | 9/2003 | Anderson et al. ............. | 709/245 |

FOREIGN PATENT DOCUMENTS
EP    1215597 A2 *  6/2002

\* cited by examiner

*Primary Examiner* — Dustin Nguyen
(74) *Attorney, Agent, or Firm* — J. B. Kraft; Steven L. Bennett

(57) ABSTRACT

Simplifying any cumbersome URLs that are made public. The function of converting to simplify cumbersome URLs is performed by Web service providers for appropriate fees. Accordingly, the converted URL will have a new domain portion, i.e. the Web service provider's domain along with a simplified path portion defining the path with the Web service provider's domain that will point to the original URL, stored within the service provider. Within the service provider, URLs of said accessed Web documents are converted to include a domain section specifying the service provider's domain and a path portion within said service provider's domain that is simpler than the original URL path portion. The path portion in the converted URL is usually shorter than the path portion in the original URL.

6 Claims, 4 Drawing Sheets

IN A WORLD WIDE WEB COMMUNICATIONS NETWORK SIMPLIFYING THE UNIFORM RESOURCE LOCATORS (URLS) DISPLAYED IN ASSOCIATION WITH RECEIVED WEB DOCUMENTS

TECHNICAL FIELD

The present invention relates to computer managed communication networks such as the World Wide Web (Web) and, particularly, to systems, processes and programs for making the interactive user display interface, i.e. GUI, to Web pages received from the Web more user friendly and easier to use with respect to Uniform Resource Locators (URLs) that are the addresses of the database sources on the Web from which the displayed Web documents have been accessed.

BACKGROUND OF RELATED ART

For decades, the data processing industries have been devoting great resources to making computer supported user interactive display technology systems and methods to provide interactive users with an interface environment that is easy to use. This has been a major task since the great expansion of computer users over the past decade has expanded computer use to less and less skilled and sophisticated users. This effort has been further driven by the rise of the Internet or Web. The latter two terms are meant to be interchangeable and are used as such throughout this application. In effect, there has been a technological revolution driven by the convergence of the data processing industry with the consumer electronics industry. This advance has been even further accelerated by the extensive consumer and business involvement in the Internet over the past five years. As a result of these changes, it seems as if virtually all aspects of human endeavor in the industrialized world requires human-computer interfaces. There is a need to make computer directed activities accessible to a substantial portion of the industrial world's population; which, up to a few years ago was computer-illiterate or, at best, computer indifferent. The population will, to a large part, have to become involved with computer interfaces and computer interfaces must, thus, continue to be simplified and made more user friendly.

This problem of simplification is particularly pronounced in the Web or Internet. Hypertext Markup Language (HTML), which has been the documentation language of the Internet or Web for years, offers direct links between pages and other documentation on the Web and a variety of related data sources that were, at first, text and then images, and now include media, i.e. "hypermedia", that involves audio, video and all types of visual files. It is now possible for the Web user to literally spend hours going through Web pages or document after document in search of subject matter of interest to the user. It is frequently the case that after the user has gone through page upon page of Web documents, he wishes to go back to certain pages of interest.

These pages are identified by their addresses on the Web, i.e. URLs. As source databases on the Web have become more numerous and extensive, the URLs have become much more lengthy and complex. Such increased length and complexity of URLs have been intensified by the present use of automated Web search engines to locate user sought documents. These search engines operate dynamically and automatically on the Web, and use robot crawlers, also referred to as spiders or harvesters that interface with the user's Web browsers through requests and responses to locate Web pages in the Web database sources. As the robots crawl through such combined databases to locate the sought Web documents, they dynamically generate the URLs of the accessed Web documents. These URLs conventionally consist of a lead portion defining the domain of the Web database source followed by a description of the path that the robot followed through the hierarchy of the source database to reach the document location. These automatically generated URLs have highly complex and lengthy path portions, often full of question marks and other command punctuation, such as "&, %, $ and +".

Thus the user and, particularly, the limited or computer novice user is faced with a difficult and tedious burden in attempting to retrieve Web documents of interest by entering the URLs of such documents. Of course bookmarking, which enables the user to have his Web browser save the lengthy and complex URLs for subsequent Web document retrieval, has been an enormous aid to users in such retrieval. However, there remains a great many circumstances wherein the user must enter a complex and lengthy URL. There is still a great need in Web document accessing to relieve users of this burden. Large database sources or domains maintained, i.e. owned, or hosted by large business, educational or governmental entities do employ internal techniques to make URLs of their Web documents simpler and more user-friendly. This may involve generating static Web pages from the dynamic data and storing the pages in the database of the source. Search robots or users visiting the source database, e.g. Web site, may then use conventional simple URLs. Alternatively, there are techniques available for rewriting the URL to simplify it by modifying the path portion of the URL but always within the database source, i.e. the domain portion of the URL does not change.

SUMMARY OF THE PRESENT INVENTION

The present invention provides a method, system and program of doing business that enables the owners and hosts of smaller database sources, e.g. Web sites, and other interested Web users with a convenient and effective implementation for inexpensively simplifying any cumbersome URLs that are made public. The key to the invention is to turn the function of converting to simpler URLS from cumbersome URLs over to Web service providers. Accordingly, the converted URL will have a new domain portion, i.e. the Web service provider's domain, along with a simplified path portion defining the path with the Web service provider's domain.

In its broadest aspects, the present invention relates to a Web communication network with user access via a plurality of data processor controlled interactive receiving display stations for displaying received Web documents accessible from database sources on the Web. The invention provides an implementation for simplifying the URLs displayed for each received Web document that uses the standard service provider means for accessing Web documents for the receiving display stations responsive to user requests in combination with conventional Web database source servers, response to service provider requests that include means for accessing requested Web documents from said Web database sources, and means for defining the URLs for said accessed Web documents to include a URL domain section and a URL path portion within the database source. In this environment, the invention provides means within the service provider to convert the original URLs of said accessed Web documents to include a domain section specifying the service provider's domain and a path portion within said service provider's domain that is simpler than the original URL path portion.

The path portion in the converted URL is usually shorter than the path portion in the original URL. The invention is particularly effective in dealing with the above-mentioned resulting problems when the means for defining the URLs for the accessed Web documents dynamically generate the URL path portion.

Most effective results are achieved when the means for converting said original URLs are optional, and there are means enabling an authorized user to activate said optional means for converting the original URLs. In such an operation, there should be means in the service provider to charge a user a fee for activating the conversion of an original URL. The user activating said means for converting may, of course, be the host or owner of a Web database source defining the original URL.

The service provider would also effect reconversion through means for respectively reconverting the converted URLs back to the original URLs whereby Web document requests directed to said converted URLs will respectively be transmitted through the service provider to the database sources on the Web.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
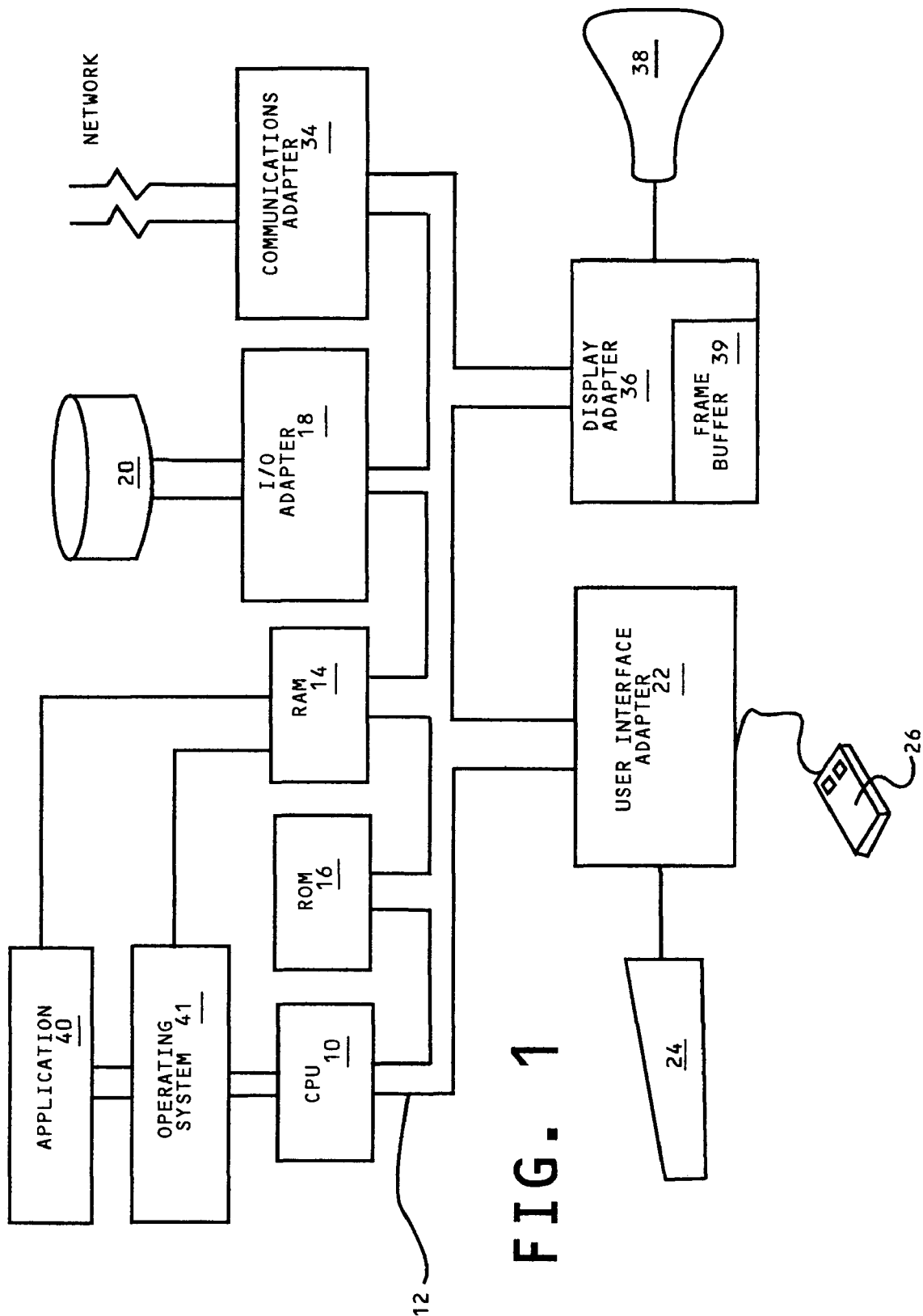
FIG. 1 is a block diagram of a data processing system including a central processing unit and network connections via a communications adapter that is capable of implementing the receiving display station on which the received Web pages may be displayed. The system may be used for conventional servers used throughout the Web for Web access servers, source database servers, as well as the servers used by the service providers in accordance with this invention.

Referring to FIG. 1, a typical data processing terminal is shown that may function as the receiving display station on which the received Web pages may be displayed. The system may also be used for conventional servers used throughout the Web for Web access servers, source database servers, as well as the servers used by the service providers in accordance with this invention. A central processing unit (CPU) 10, such as one of the PC microprocessors or workstations, e.g. RISC System/6000™ series available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems, such as IBM's AIX 6000™ operating system or Microsoft's WindowsXP™ or Windows2000™, as well as UNIX and other IBM AIX operating systems. Application programs 40, controlled by the system, are moved into and out of the main memory Random Access Memory (RAM) 14. These programs include the program of the present invention that will be described hereinafter for operations wherein the system of FIG. 1 functions as the servers used by the service providers in accordance with this invention. The programs will convert and simplify URLs within the service provider. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Internet or Web network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs of this invention. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through keyboard 24 or mouse 26 and receiving output information from the system via display 38.

Before going further into the details of specific embodiments, it will be helpful to understand from a more general perspective the various elements and methods that may be related to the present invention. Since a major aspect of the present invention is directed to documents, such as Web pages and media content therein, transmitted over networks, an understanding of networks and their operating principles would be helpful. We will not go into great detail in describing the networks to which the present invention is applicable. Reference has also been made to the applicability of the present invention to a global network, such as the Internet or Web. For details on Internet nodes, objects and links, reference is made to the text, *Mastering the Internet*, G. H. Cady et al., published by Sybex Inc., Alameda, Calif., 1996.

The Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. In this connection, the term "documents" is used to describe data transmitted over the Web or other networks and is intended to include Web pages with displayable text, graphics, other images and audio. This displayable information may be still, in motion or animated, e.g. animated GIF images.

Web documents are conventionally implemented in HTML language, which is described in detail in the text entitled *Just Java*, van der Linden, 1997, SunSoft Press, particularly at Chapter 7, pp. 249-268, dealing with the handling of Web pages; and also in the above-referenced *Mastering the Internet*, particularly at pp. 637-642, on HTML in the formation of Web pages. In addition, aspects of this description will refer to Web browsers. A general and comprehensive description of browsers may be found in the above-mentioned *Mastering the Internet* text at pp. 291-313. More detailed browser descriptions may be found in the above-mentioned *Internet: The Complete Reference, Millennium Edition* text: Chapter 19, pp. 419-454, on the Netscape Navigator; Chapter 20, pp. 455-494, on the Microsoft Internet Explorer; and Chapter 21, pp. 495-512, covering Lynx, Opera and other browsers.

In the description of the invention, search engines will be used to locate and pre-access the previously accessed Web documents stored at the receiving display stations. As described in the above-mentioned *Internet: The Complete Reference, Millenium Edition* text, pp. 395 and 522-535, search engines use keywords and phrases to query the Web for desired subject matter. In carrying out its search, the search engine looks through the database for matches to keywords subject to the engine syntax. The search engine then presents to the user a list of the Web pages it determines to be closest to the requested query. Some significant search engines are: AltaVista, Infoseek, Lycos, Magellan, Webcrawler and Yahoo.

Figure 2:
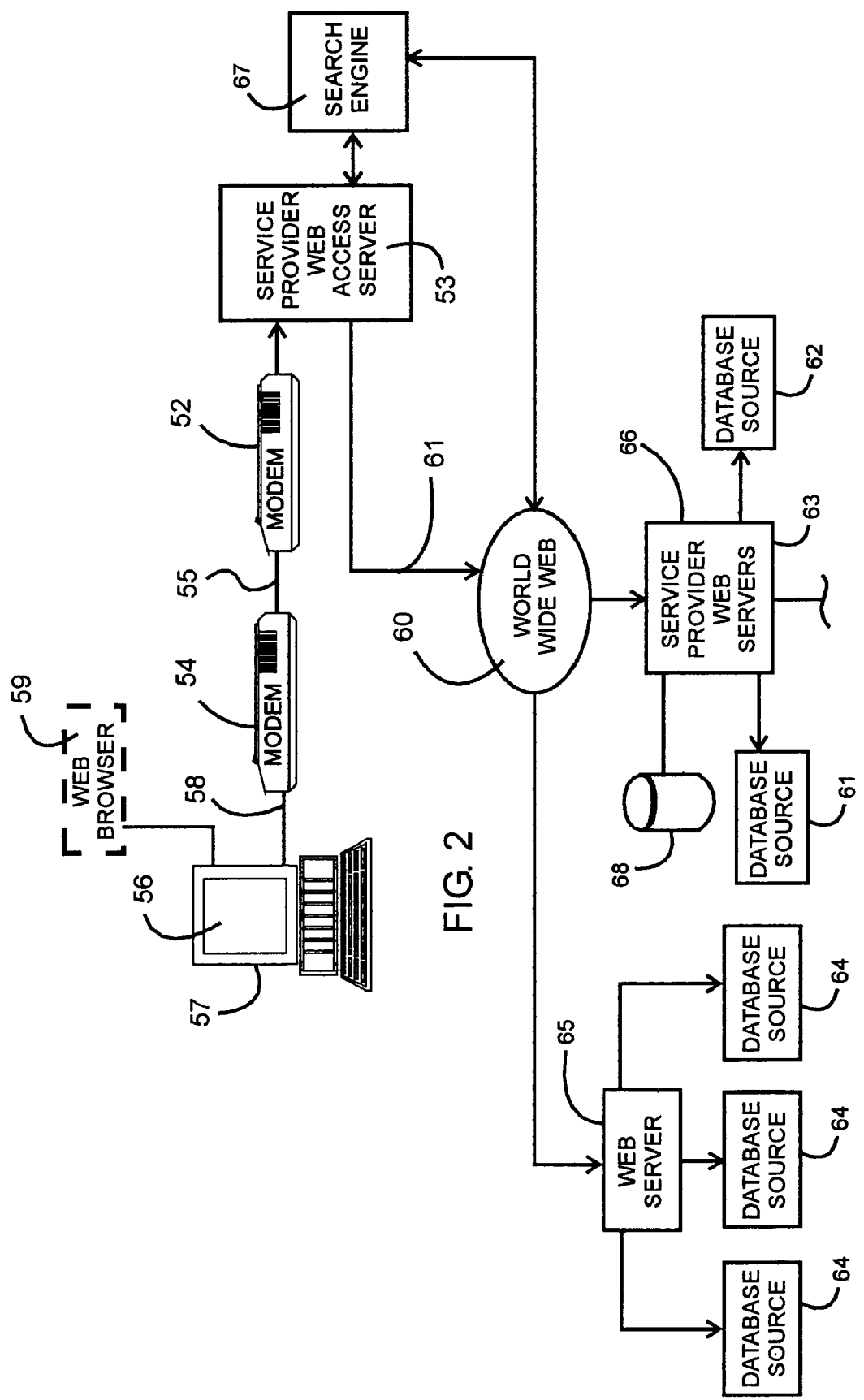
FIG. 2 is a generalized diagrammatic view of a Web portion upon which the present invention may be implemented.

A generalized diagram of a portion of the Web in which the computer controlled display terminal 57 used for Web page receiving during searching or browsing is connected as shown in FIG. 2. Computer display terminal 57 may be implemented by the computer system set up in FIG. 1 and connection 58 (FIG. 2) is the network connection shown in FIG. 1. For purposes of the present embodiment, computer 57 serves as the receiving Web display station that will access Web documents, e.g. pages that are displayed 56. Reference may be made to the above-mentioned *Mastering the Internet*, pp. 136-147, for typical connections between local display stations to the Web via network servers; any of which may be used to implement the system on which this invention is used. The system embodiment of FIG. 2 has a host-dial connection. Such host-dial connections have been in use for over 30 years through network access servers 53 that are linked 61 to the Web 60. The Web servers 53 that also may have the computer structure described with respect to FIG. 1, may be maintained by a Web Service Provider to the client's display terminal 57. Such Web or Internet Service Providers (ISPs) are described generally in the above-mentioned text, *Internet: The Complete Reference, Millenium Edition* at pages 14-18. The Web server 53 is accessed by the client receiving terminal 57 through a normal dial-up telephone linkage 58 via modem 54, telephone line 55 and modem 52. Any conventional digital or analog linkages, including wireless connections, are also usable. The previously described search engines 67 contacted conventionally via Web access servers search the Web and send the selected Web documents back to the receiving display station 57 on which they may be conventionally displayed on real-time basis.

The Web documents are accessed from the Web database sources 64 through appropriate Web database access servers 65. Other database sources, such as sources 61 and 62, may be accessed through Web servers 66 maintained by service providers. It is through such service providers 66 that the present invention may be implemented.

Web server systems and, particularly, Web server systems that generate their URLs dynamically are described in the article, *Adaptive Fast Path Architecture*, E. C. Hu et al., IBM Journal of Research, Volume 45, No. 2, 2001.

The following is an example of a cumbersome URL that could be automatically generated:

"http://www.ibm.com/webapp/wcs/stores/servlet/C
ategory/Display?calalogld=−
840&storeId=1&categoryId=2072540&langId=−
1&dualCurrId=73"

This URL would have to be typed in order on the receiving display in order to access a reference to an "IBM ThinkPad Notebook Model A" description from a database source on the Web on which a "Business Week" article was stored. As will be subsequently described in greater detail with respect to FIGS. 3 and 4, the service provider could simplify the URL to a shortened:

"http://www.citation.com/businessweek/ThinkPadA"
or
"http://www.citation.com/BW/Feb03/ibm01"

In effect, the domain portion of the URL has been converted from that of the owner of the database, "www.ibm.com", to the domain of the service provider, "www.citation.com". Also, the path portion of the URL has been converted and shortened from over 125 characters, some of which are complex, to a shortened and simplified public URL with a 10 to 12 character path defining the hierarchy within service provider 66 database 68 pointing to stored data for reconverting the converted public URL to the original URL so that the appropriate Web document may be accessed from source databases 61 and 62 or that connected to 63.

Figure 3:
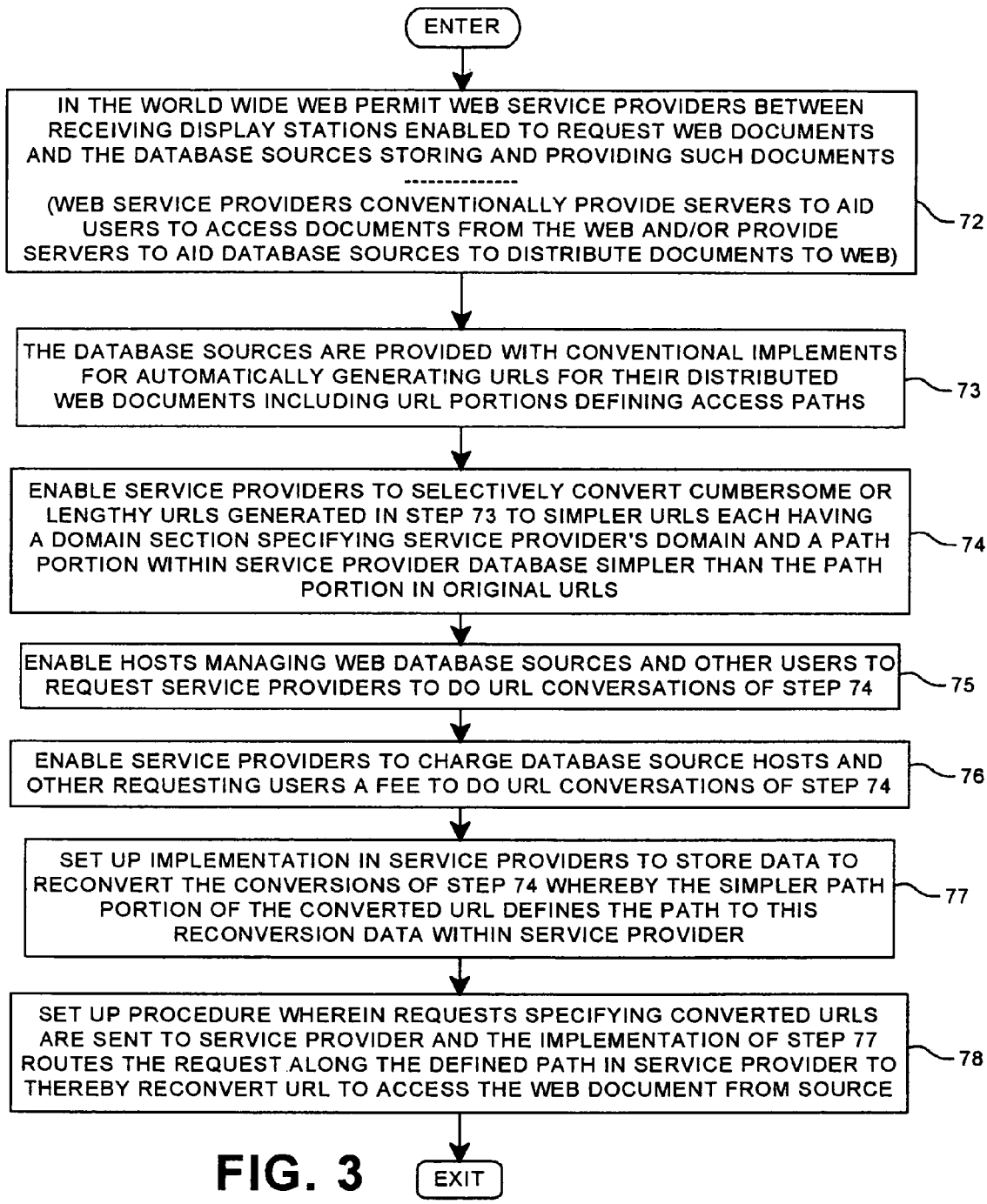
FIG. 3 is a general flowchart of a program set up to implement the present invention for converting to simplify the URLs defining the database sources of Web documents.

FIG. 3 is a flowchart showing the development of a process according to the present invention for simplifying complex and lengthy URLs by conversion to simplified public URLs. Many of the programming functions in the process of FIG. 3 have already been described in general with respect to FIGS. 1 and 2. In the Web, service providers are available between the Web document requesting and receiving display stations and the database sources on the Web storing and providing Web documents. These Web service providers conventionally provide servers to aid users in accessing documents from the Web and/or providing servers to distribute documents to the Web from the database sources, e.g. Web sites, step 72. The database sources are provided with implementations for automatically generating URLs for their distributed Web documents, including URL portions defining access paths, step 73. The service providers are enabled to selectively convert cumbersome or lengthy URLs generated in step 73 to simpler URLs each having a domain section specifying the service provider's domain and a path portion within the service provider's database that is much simpler and shorter than the path portion in the original URL, step 74. Step 75, the hosts managing database sources and other users are enabled to request that the service providers do the URL conversions of step 74. Service providers are enabled, step 76, to charge database source hosts and other requesting users a fee to do the conversions of step 74. An implementation is set up in the service providers to store data to reconvert the conversions of step 74 whereby the simpler path portion of the converted URL defines the path to this reconversion data within the service provider, step 77. A procedure is also set up, step 78, wherein Web document requests specifying converted URLs are sent to the service provider and the implementation of step 77 routes the request along the defined path in the service provider to thereby reconvert the URL to access the Web document from the source.

Figure 4:
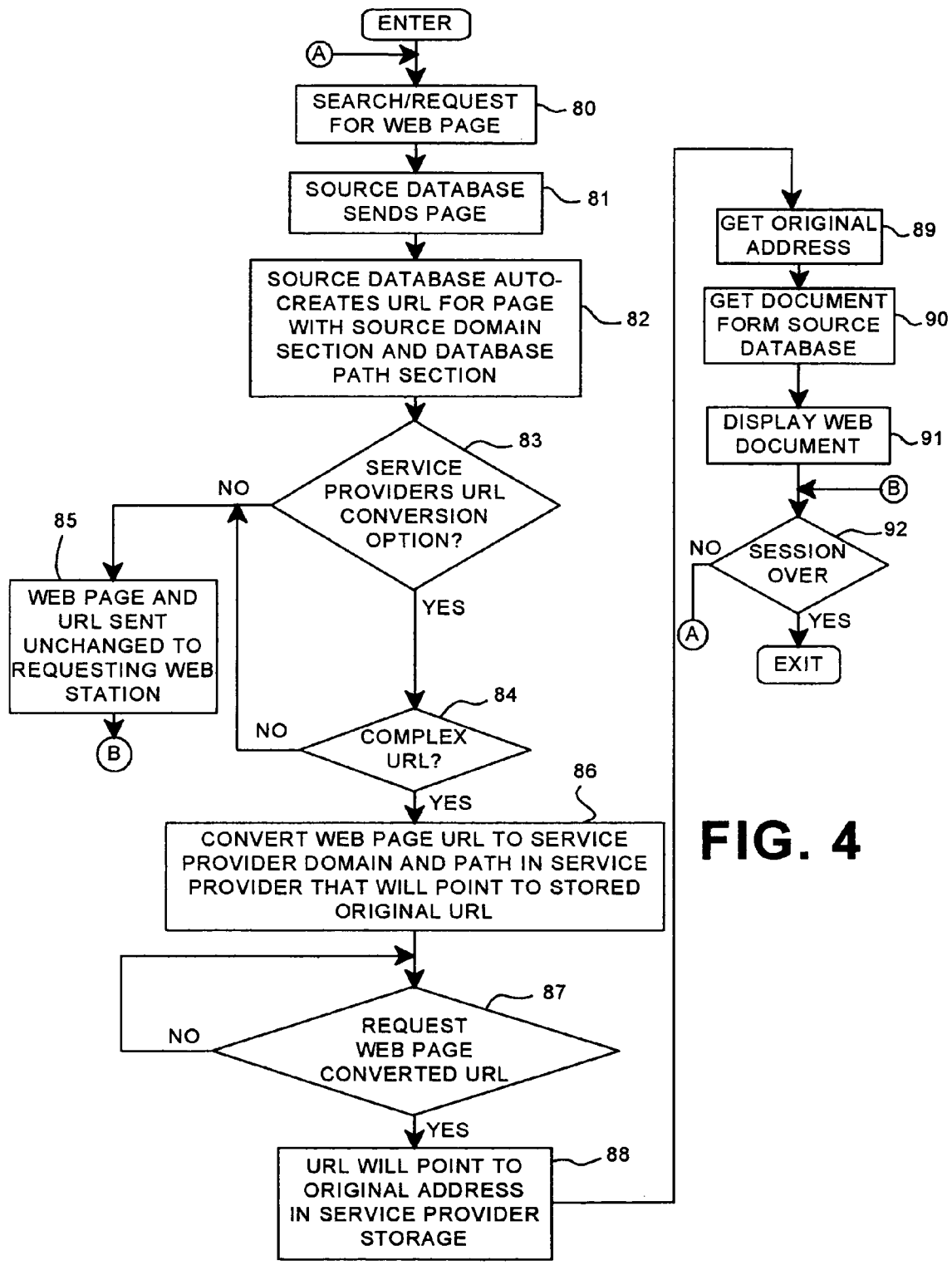
FIG. 4 is a flowchart of an illustrative run of the program set up in FIG. 3.

The running of the process set up in FIG. 3 will now be described with respect to the flowchart of FIG. 4. First, step 80, Web pages selected for the user through search or request are accessed and the source database provides the Web page, step 81. The source database system will automatically create the URL for the requested or searched Web page, step 82. The URL will have a domain section defining the domain of the source database and a database path section. Next, a determination is made as to whether the particular service provider offers a URL conversion option, step 83. If No, the Web page and its identifying URL are sent unchanged to the requesting receiving display station on the Web, step 85. If, Yes, a further determination is made, step 84, as to whether the URL is sufficiently complex or lengthy to warrant a URL conversion, i.e. it may not be efficient to convert all original URLs since some may turn out to be quite short and simple. The user requesting the URL conversion service from the service provider may set up conditions precedent for URL conversion, e.g. "only when the path portion exceeds 15 characters in length". Thus, if the determination in step 84 is No, the URL is not sufficiently complex, then, the Web page and its identifying URL are sent unchanged to the requesting receiving display station on the Web, step 85. If the determination in step 85 is Yes, then the URL is converted to set forth the domain of the service provider and a path within the service provider database that will point to the original URL that is stored in the provider's database. The converted URL path will be simpler and shorter than the original URL path. Next, at some subsequent processing point, a determination may be made, step 87, Yes, a Web page has been requested through its converted URL. Then, step 88, the converted URL path will point to the original URL address in the service provider's database storage, the original URL will be retrieved, step 89, which will lead to the database source domain and then the path to the Web document within the domain hierarchy, step 90, whereby the requested Web document may be displayed, step 91. At this point, or after step 85 via branch "B", a determination may conveniently be made as to whether the session is over, step 92. If Yes, the session is exited. If No, the session is returned to step 80 via branch "A".

Although certain preferred embodiments have been shown and described, it will be understood that many changes and modifications may be made therein without departing from the scope and intent of the appended claims.

What is claimed is:

1. In a Web communication network with user access via a plurality of data processor controlled interactive receiving display stations for displaying received Web documents accessible from database sources on the Web, a method for simplifying the URLs displayed for each received Web document comprising:
   accessing Web documents through service providers for said receiving display stations responsive to user requests;
   accessing requested Web documents from remote Web database source servers, responsive to service provider requests;
   defining the URLs for said accessed Web documents to include a URL domain section and an automatically generated URL path portion within the database source; and
   converting, in said service provider, said defined URLs of said accessed Web documents to include a domain section specifying the service provider's domain and a path portion within said service provider's domain simpler and shorter than the URL path portion;
   reconverting said converted URLs, in said service provider, back to the defined URLs; wherein Web document requests directed to said converted URLs will respectively be transmitted through the service provider to the database sources on the Web; and
   enabling said service provider to charge a user a fee for activating said apparatus for converting a defined URL.

2. The method of claim 1 wherein said user activating said step of converting is a host of a Web database source defining the defined URL.

3. A non-transitory computer medium having stored thereon a computer readable program for simplifying the URLs displayed for Web documents received at display stations in a World Wide Web communication network from sources on the Web, wherein the computer readable program when executed on a computer causes the computer to:
   access Web documents through service providers for said receiving display stations responsive to user requests;
   access requested Web documents from remote Web source servers, responsive to service provider requests;
   define the URLs for said accessed Web documents to include a URL domain section and an automatically generated URL path portion within the source; and
   convert, in said service provider, defined URLs of said accessed Web documents to include a domain section specifying the service provider's domain and a path portion within said service provider's domain simpler and shorter than the defined URL path portion;
   reconvert said converted URLs, in said service provider, back to the defined URLs; wherein Web document requests directed to said converted URLs will respectively be transmitted through the service provider to the remote sources on the Web; and
   enable said service provider to charge a user a fee for activating said apparatus for converting a defined URL.

4. The non-transitory computer medium of claim 3 wherein said user activating said step of converting is a host of a Web database source defining the defined URL.

5. In a Web communication network with user access via a plurality of data processor controlled interactive receiving display stations for displaying received Web documents accessible from database sources on the Web, a system for simplifying the URLs displayed for each received Web document, said system comprising:
   a processor;
   a computer memory holding computer program instructions which when executed by the processor perform the method comprising:
   accessing Web documents through service providers for said receiving display stations responsive to user requests;
   accessing requested Web documents from remote Web database source servers, responsive to service provider requests;
   defining the URLs for said accessed Web documents to include a URL domain section and an automatically generated URL path portion within the database source; and
   converting, in said service provider, said defined URLs of said accessed Web documents to include a domain section specifying the service provider's domain and a path portion within said service provider's domain simpler and shorter than the URL path portion;
   reconverting said converted URLs, in said service provider, back to the defined URLs; wherein Web document requests directed to said converted URLs will respectively be transmitted through the service provider to the database sources on the Web; and
   enabling said service provider to charge a user a fee for activating said apparatus for converting a defined URL.

6. The system of claim 5 wherein said user activating said converting is a host of a Web database source defining the defined URL.

* * * * *